(12) United States Patent
Kroeze et al.

(10) Patent No.: US 11,511,669 B1
(45) Date of Patent: Nov. 29, 2022

(54) SYSTEM AND METHOD FOR TRAILER COUPLER LOCALIZATION FOR GUIDANCE DURING A HITCHING MANEUVER

(71) Applicant: GM GLOBAL TECHNOLOGY OPERATIONS LLC, Detroit, MI (US)

(72) Inventors: Zachary T. Kroeze, Toronto (CA); Yun Qian Miao, Waterloo (CA); Shi M. Yu, Toronto (CA); Patrick Andruszkiewicz, Mississauga (CA); Ralph D. Schlottke, Whitby (CA)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 17/315,769

(22) Filed: May 10, 2021

(51) Int. Cl.
　　*B60R 1/00*　　(2022.01)
　　*G06T 7/70*　　(2017.01)
　　*B60W 60/00*　　(2020.01)
　　*B60D 1/06*　　(2006.01)

(52) U.S. Cl.
　　CPC .............. *B60R 1/003* (2013.01); *B60D 1/06* (2013.01); *B60W 60/001* (2020.02); *G06T 7/70* (2017.01); *B60R 2300/10* (2013.01); *B60R 2300/20* (2013.01); *B60R 2300/808* (2013.01); *G06T 2207/30252* (2013.01)

(58) Field of Classification Search
　　CPC .......... B60D 1/06; B60D 1/065; B60D 1/075; B60D 1/07; B60D 1/36; B60D 1/363; B60D 1/64; B60D 1/38; B60D 1/245; B60R 1/003; B60R 1/002; B60R 2300/808; B60R 1/00; B60W 2420/42; B60K 2370/21

USPC .......................................................... 348/148
See application file for complete search history.

(56) References Cited

U.S. PATENT DOCUMENTS

| 7,568,716 | B2* | 8/2009 | Dietz ...................... B60D 1/36 348/148 |
| 2014/0125795 | A1* | 5/2014 | Yerke ........................ B60R 1/00 348/118 |
| 2018/0147900 | A1* | 5/2018 | Shank ..................... B60R 25/25 |
| 2021/0061280 | A1* | 3/2021 | Niewiadomski ..... G05D 1/0225 |
| 2022/0134951 | A1* | 5/2022 | Zhang ........................ G06T 7/73 348/148 |

* cited by examiner

Primary Examiner — Nathnael Aynalem
(74) Attorney, Agent, or Firm — Quinn IP Law

(57) ABSTRACT

A system for trailer coupler localization for guidance during a hitching maneuver for a vehicle includes a trailer device including a trailer coupler and a graphic providing structure affixed to the trailer coupler. The structure includes at least one predefined graphic image. The system further includes a rear facing camera device attached to the vehicle and providing a captured image of the predefined graphic image. The system further includes a computerized controller, including programming to receive and analyze the captured image of the predefined graphic image to determine a relative position of the graphic providing structure to the camera device. The controller further includes programming to utilize the analysis to determine a relative position of the trailer coupler to a trailer hitch ball of the vehicle and to provide an output to control the hitching maneuver based upon the relative position.

20 Claims, 8 Drawing Sheets

SYSTEM AND METHOD FOR TRAILER COUPLER LOCALIZATION FOR GUIDANCE DURING A HITCHING MANEUVER

INTRODUCTION

The disclosure generally relates to a system and method for trailer coupler localization for guidance during a hitching maneuver.

A vehicle may include a trailer hitch operable to be selectably connected to a trailer coupler. In one embodiment, the trailer hitch of the vehicle may include a trailer hitch ball extending vertically upwardly from a trailer hitch bar. The trailer coupler may include a gripping feature configured to be lowered upon the trailer hitch ball and engage the trailer hitch ball. Once engaged, the trailer hitch and the trailer coupler are operable to enable the vehicle to pull the trailer upon a roadway or other surface.

A vehicle may be equipped with a rearward facing camera device useful to provide a driver with a view of a roadway surface behind the vehicle. The vehicle may be further equipped with a computerized system operable to analyze images captured by the camera device and diagnose proximity of objects to the vehicle. In one embodiment, the computerized system may provide an audible and/or graphic warning regarding the presence and position of the object in relation to the vehicle.

A vehicle may be equipped to be autonomous or semi-autonomous, for example, with a camera device and/or a light detection and ranging device (LIDAR) being used to provide information regarding an environment around the vehicle, and a computerized navigation system operable to control movement of the vehicle based upon the information.

The above features and advantages and other features and advantages of the present disclosure are readily apparent from the following detailed description of the best modes for carrying out the disclosure when taken in connection with the accompanying drawings.

SUMMARY

A system for trailer coupler localization for guidance during a hitching maneuver for a vehicle includes a trailer device including a trailer coupler and a graphic providing structure affixed to the trailer coupler. The structure includes at least one predefined graphic image. The system further includes a rear facing camera device attached to the vehicle and providing a captured image of the predefined graphic image. The system further includes a computerized controller, including programming to receive and analyze the captured image of the predefined graphic image to determine a relative position of the graphic providing structure to the camera device. The controller further includes programming to utilize the analysis to determine a relative position of the trailer coupler to a trailer hitch ball of the vehicle and to provide an output to control the hitching maneuver based upon the relative position.

In some embodiments, providing the output to control the hitching maneuver includes providing a graphical display to a driver of the vehicle describing the relative position of the trailer coupler to the trailer hitch ball of the vehicle.

In some embodiments, providing the graphical display includes providing a graphical image including a line superimposed upon an image including the trailer hitch ball and the trailer coupler, wherein the line connects the trailer hitch ball to the trailer coupler.

In some embodiments, the line is color-coded to indicate an accuracy of execution of the hitching maneuver.

In some embodiments, providing the graphical display includes providing a distance between the trailer hitch ball and the trailer coupler.

In some embodiments, providing the graphical display includes providing a vertical clearance between a top of the trailer hitch ball and a bottom of the trailer coupler.

In some embodiments, the computerized hitching maneuver controller further includes programming to determine a relative orientation of the trailer coupler to the trailer hitch ball.

In some embodiments, the graphic providing structure further includes a plurality of predefined graphic images.

In some embodiments, a first predefined graphic image is forward facing and disposed upon a front of the trailer coupler, and a second predefined graphic image is upward facing and disposed upon a top of the trailer coupler.

In some embodiments, a third predefined graphic image is disposed upon a first side of the trailer coupler, and a fourth predefined graphic image is disposed upon a second side of the trailer coupler.

In some embodiments, the predefined graphic image includes a black and white block image.

In some embodiments, the predefined graphic image includes a block pattern marker image.

In some embodiments, providing the output to control the hitching maneuver includes providing data to a computerized autonomous navigation controller of the vehicle.

In some embodiments, the graphic providing structure includes an attachment arm operable to be attached to a lever lock through feature of the trailer coupler.

According to one alternative embodiment, a system for trailer coupler localization for guidance during a hitching maneuver for a vehicle is provided. The system includes a vehicle trailer hitch feature and a trailer device including a mating trailer-mounted hitch feature. The trailer device further includes a graphic providing structure affixed to the trailer device, the graphic providing structure including at least one predefined graphic image. The system further includes a rear facing camera device attached to the vehicle and operable to provide a captured image of the predefined graphic image. The system further includes a computerized hitching maneuver controller, including programming to receive the captured image of the predefined graphic image and analyze the captured image of the predefined graphic image to determine a relative position of the graphic providing structure to the rear facing camera device. The controller further includes programming to utilize a vehicle trailer hitch feature to camera device offset value, a mating trailer-mounted hitch feature to graphic providing structure offset value, and the relative position of the graphic providing structure to the rear facing camera device to determine a relative position of the mating trailer-mounted hitch feature to the vehicle trailer hitch feature. The controller further includes programming to provide an output to control the hitching maneuver based upon the relative position of the mating trailer-mounted hitch feature to the vehicle trailer hitch feature.

In some embodiments, the vehicle trailer hitch feature includes a hitch head disposed upon the vehicle, and the mating trailer-mounted hitch feature includes a kingpin disposed upon the trailer device.

According to one alternative embodiment, a method for trailer coupler localization for guidance during a hitching maneuver for a vehicle is provided. The method includes utilizing a rear facing camera device upon the vehicle to provide a captured image of a graphic providing structure attached to a trailer coupler, wherein the captured image includes at least one predefined graphic image imprinted upon the graphic providing structure. The method further includes, within a computerized processor, operating programming to receive the captured image including the predefined graphic image and analyze the captured image including the predefined graphic image to determine a relative position of the graphic providing structure to the rear facing camera device. The method further includes, within the computerized processor, further operating programming to utilize a trailer hitch ball to camera device offset value, a trailer coupler to graphic providing structure offset value, and the relative position of the graphic providing structure to the rear facing camera device to determine a relative position of the trailer coupler to a trailer hitch ball of the vehicle. The method further includes, within the computerized processor, further operating programming to provide an output to control the hitching maneuver based upon the relative position of the trailer coupler to the trailer hitch ball of the vehicle.

In some embodiments, providing the output to control the hitching maneuver includes providing a graphical display to a driver of the vehicle describing the relative position of the trailer coupler to the trailer hitch ball of the vehicle.

In some embodiments, the method further includes determining a relative orientation of the trailer coupler to the trailer hitch ball.

In some embodiments, providing the output to control the hitching maneuver includes providing data to a computerized autonomous navigation controller of the vehicle.

The above summary is not intended to represent every embodiment or every aspect of the present disclosure. Rather, the foregoing summary merely provides an exemplification of some of the novel concepts and features set forth herein. The above features and advantages, and other features and advantages, will be readily apparent from the following detailed description of illustrated embodiments and representative modes for carrying out the disclosure when taken in connection with the accompanying drawings and appended claims. Moreover, this disclosure expressly includes all combinations and sub-combinations of the elements and features presented above and below.

DETAILED DESCRIPTION

Figure 1:
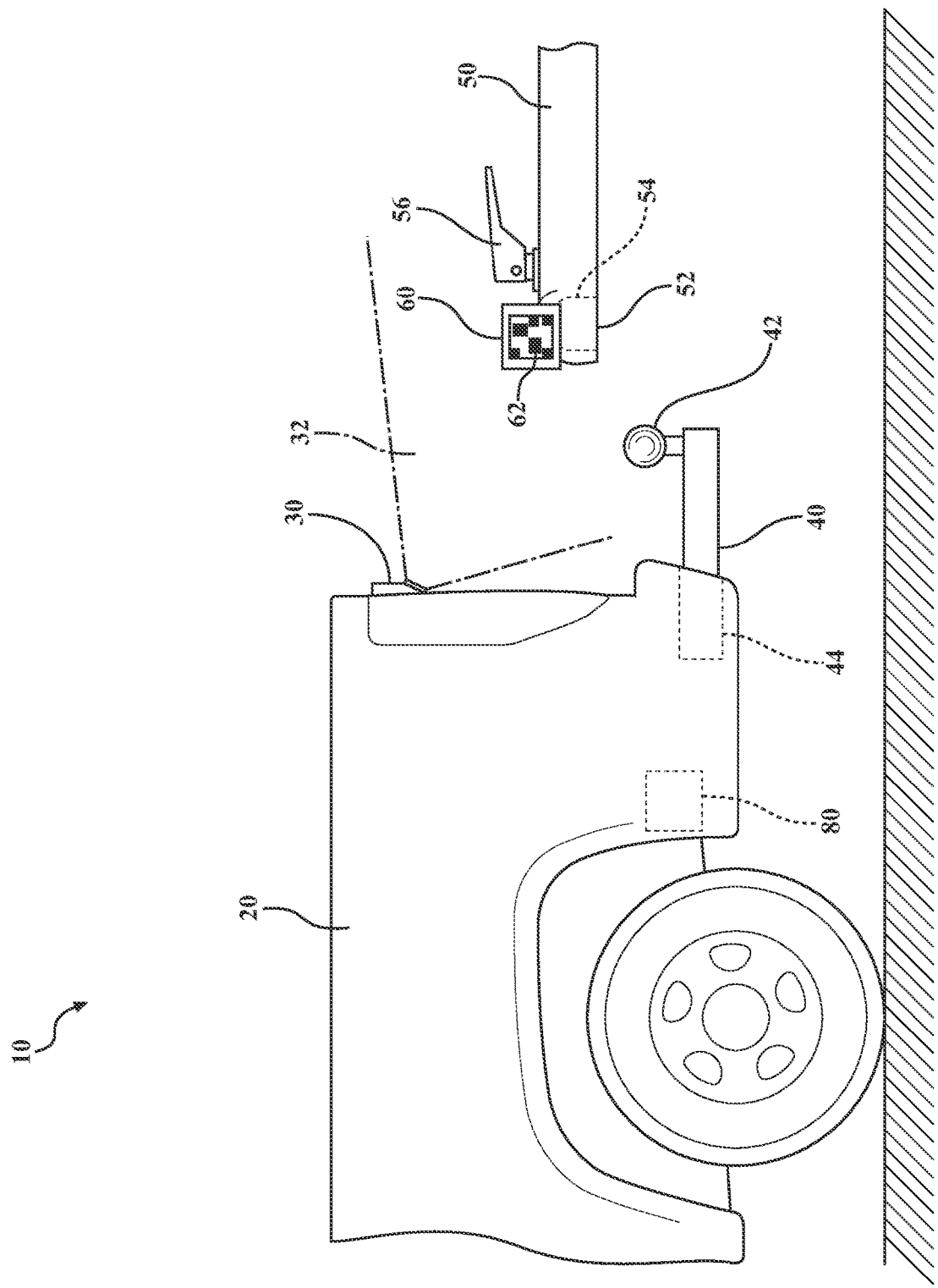
FIG. 1 schematically illustrates in side view a system for trailer coupler localization for guidance during a hitching maneuver, in accordance with the present disclosure.

A hitching maneuver includes a trailer hitch of a vehicle being connected with a trailer coupler. The vehicle moves backward and is navigated such that the trailer hitch ball is disposed directly below a gripping feature of the trailer coupler. A camera device may be utilized to aid in a hitching maneuver, providing a driver or an automated navigation system visual feedback to correctly navigate the trailer hitch ball into position.

Visible features within an image captured by a camera device may be analyzed by a computerize system upon a vehicle. For example, features in an image may be filtered and compared to predefined shapes to diagnose a presence of an object and to determine an approximate location of an object. A series of images may be similarly filtered and analyzed, with movement of the vehicle and with changing shapes in the series of images confirming or reinforcing diagnosed conditions such as an approximated position of an object in the view.

An image or a series of images of a trailer coupler close to a rear of a vehicle may be filtered and analyzed, with the analysis providing an estimated relative position of the trailer coupler to the camera device. Based upon predefined or determinable geometry of the vehicle (e.g., a relative position of a trailer hitch ball to the camera device), an estimated relative position of the trailer coupler to the trailer hitch ball may be determined. In one embodiment, an unscented Kalman filter may be utilized to increase accuracy of dynamic determinations of estimated relative position and relative orientation as well as robustness from partial occlusion.

An accurate estimation of a relative position of the trailer coupler to the camera device may depend upon how accurately a computerized system analyzing the image or images may identify the trailer coupler and/or identifying features proximate to the trailer coupler. Trailer couplers are made by a plurality of manufacturers. Trailer couplers and vehicles may be made by different manufacturers. One may alter an original trailer coupler with a replacement trailer coupler. A single vehicle may be utilized to hitch to a plurality of different trailers with different trailer couplers. A system and method for trailer coupler localization for guidance during a hitching maneuver is provided wherein a predefined image is disposed upon the trailer coupler. The predefined image may include a graphical image which may be loaded into a visual library of the computerized system. Spatial details for the graphical image are stored in the memory of the computerized system. In one embodiment, spatial details upon the graphical image may be useful to provide a distance from the graphical image to a camera device. In another embodiment, spatial details upon the graphical image may be useful to provide a relative position of the graphical image in relation to the camera device. In another embodiment, spatial details upon the graphical image may be useful to provide a relative position and a relative orientation of the graphical image in relation to the camera device. By disposing a predefined image upon the trailer coupler, accuracy of estimations of the trailer coupler's relative position and relative orientation to the trailer hitch ball of the vehicle may be improved.

A trailer and a vehicle may approach each other from various different angles. Additionally, a camera device upon a vehicle may be higher upon the vehicle or further from a ground level than the trailer coupler. Upon an exemplary light duty truck, a camera device is frequently disposed upon an upper half of a tailgate device oriented downwardly to capture images of an exemplary parking spot behind the vehicle. The term light duty truck as used herein describes an exemplary classification of pick-up truck utilized by the public, includes such vehicles as the Chevrolet® Silverado® and the GMC® Sierra®, and is not intended to convey a relative weight or measure of the vehicle. Similarly, medium duty truck and commercial truck are intended to provide examples of classifications of vehicles as described widely in the art. As a result of such a relatively high location of the camera device, if a single, flat graphical image is situated orthogonally or aligned with a longitudinal axis of the trailer on a front of the trailer coupler, a camera device located above a trailer within a threshold distance to the trailer and/or turned ninety degrees or a relatively large angle to one side in relation to the camera device may be unable to see or accurately recognize the graphical image. In one embodiment, a second predefined image may be disposed upon the trailer coupler, wherein either the first predefined image or the second predefined image, captured in an image by the camera device, may be utilized to estimate a relative position and relative orientation of the trailer coupler to the camera device. In one embodiment, a first predefined image may be disposed facing forward upon the trailer coupler, such that a person or camera device situated a threshold minimum distance in front of the trailer coupler may ideally see the first predefined image. Additionally, a second predefined image may be disposed facing upward, at a perpendicular orientation to the first predefined image, such that a person or camera device situated directly above the trailer coupler may ideally see the second predefined image. With such a configuration of a first predefined image and a second predefined image, a vehicle with a camera located higher than the trailer coupler may capture images of at least one of the first predefined image and the second predefined image as the vehicle approaches or reduces a distance to the trailer coupler. Similarly, one or two additionally predefined images may be disposed, for example, one on either side of the upward facing second predefined image, further enabling a camera device to estimate a relative position and a relative orientation of the trailer coupler from various perspective locations of the camera device.

In some embodiments, an alternative orientation of the first predefined graphical image may be utilized to compensate for a height of the camera device. For example, the first predefined graphical image as a flat image may be angled upward from a longitudinal axis by some angle, for example, forty-five degrees from the longitudinal axis. Such an angle not in line with or perpendicular to the longitudinal axis may increase visibility of the graphical image to the camera device. In some embodiments, accurately aligning such a graphical image to the trailer coupler may be difficult to achieve, for example, in an aftermarket condition, making use of such a single predefined graphical image difficult. For example, if the computerized system of the vehicle is pre-loaded with information that the first predefined image is oriented forty-five degrees from the longitudinal axis, and, in reality, the first predefined image is actually oriented thirty degrees from the longitudinal axis, an estimated orientation of the trailer coupler may be incorrect. However, an initial hitching routine may be programmed in the computerized system enabling the operator to manually hitch the trailer to the vehicle, and the pre-loaded angle or orientation of the first predefined image may be calibrated in the memory of the computerized system. In another embodiment, a three-dimensional predefined image may be utilized, for example, with printed graphics being disposed upon an exemplary cubical, pyramidal, or curved shape disposed upon the trailer coupler.

The predefined graphical image may be disposed upon or on top of the trailer coupler. The graphical image and a structure upon which the predefined graphical image is imprinted may be positioned to prevent the structure from interfering with the operation of the gripping feature of the trailer coupler. A trailer coupler may include a lever upon a top side of the trailer coupler, with activation of the lever enabling one to cause the gripping feature of the trailer coupler to selectably grip or release the trailer hitch ball of the vehicle. Additionally, the lever may include bracketry enabling one to place a padlock, a cotter pin, or other similar mechanism upon the lever. The structure upon which the predefined graphics are imprinted may be formed integrally with the trailer coupler, for example, formed with or welded to an outer surface of the trailer coupler. In another embodiment, the structure upon which the graphics are imprinted may be attachable to an existing trailer coupler. In one embodiment, an operator may be instructed to drill one or more holes in an existing trailer coupler, for example, with a supplied template block, and features upon the structure upon which the graphics are imprinted may fit into the drilled hole(s) to orient the structure in a desired manner with the trailer coupler.

An accurate spatial relationship of the trailer hitch ball and the camera may be important to correctly determine a relative location and relative orientation of the trailer coupler to the trailer hitch ball. Such a spatial relationship may be determined experimentally, for example, with an initial trailer hitching accomplished manually by an operator being used to determine a relative location of the trailer hitch ball to the camera device. In another embodiment, the trailer hitch may include printed graphics which may provide predefined graphical features similar to the predefined graphical image(s) upon the trailer coupler. In another embodiment, the printed graphics upon the trailer hitch of the vehicle may provide reference values such as an offset position and orientation of the trailer hitch ball as reference values in a stored library of data based upon a model of the trailer hitch.

Once determined, a relative position and relative orientation of the trailer coupler to the camera or the trailer hitch ball may be used to navigate the vehicle. In one embodiment, a graphical display device for a driver of the vehicle may provide a camera view of the trailer coupler, and additional graphics may be displayed upon the graphical display device, for example, with a line connecting the trailer hitch ball and the trailer coupler and with a distance displayed in textual information upon the display screen. In one embodiment, a vertical relationship of the trailer coupler and the trailer hitch ball may be displayed upon the graphical display device. Such a vertical relationship may be conveyed as a graphical image or text either assuring the operator that the trailer coupler is high enough to clear the trailer hitch ball or warning the operator that the trailer coupler is to be raised to avoid the trailer hitch ball contacting a side of the trailer coupler prior to the hitching maneuver. A number of graphical display embodiments are envisioned, with the estimated relative position and/or estimated relative orientation information being provided to the operator through visual feedback. In another embodiment, an automated navigational system may utilize the estimated relative position and estimated relative orientation information to adjust a steering angle of the vehicle and move the vehicle forward and/or backward to accomplish the hitching maneuver. In one embodiment, a semi-autonomous vehicle may selectably control one or both of steering angle and motion of the vehicle to assist an operator in controlling the vehicle through the hitching maneuver.

Estimating movement of the vehicle may be utilized to judge whether the vehicle is accurately executing a hitching maneuver, for example, by analyzing a trajectory of the vehicle and a resulting trajectory of the trailer hitch ball. A bicycle model may used to model the vehicle motion. Vehicle signals may be monitored and used to update the motion model. Measurement updates are given by detections of the predefined marker or predefined graphic image from the camera. Using a calibration between the rear axle of the vehicle and the hitch, the motion and measurements can be combined into a Kalman Filter. The filter increases the overall robustness of the feature and allows for partial occlusion of the object.

Referring now to the drawings, wherein like reference numbers refer to like features throughout the several views, FIG. 1 schematically illustrates in side view a system 10 for trailer coupler localization for guidance during a hitching maneuver. The system 10 is illustrated including exemplary light duty truck 20 and trailer device 50. The light duty truck 20 includes a rear facing camera device 30, a trailer hitch 40, and a trailer hitch ball 42. The light duty truck 20 may include a trailer hitch receiver 44 operable to permit selective connection and removal of the trailer hitch 40. The trailer device 50 may include a cargo carrying trailer, a boat trailer, a recreational vehicle, or a similar trailer. The trailer device 50 includes a trailer coupler 52 including a gripping feature 54 internal to the trailer coupler 52 and a gripper feature lever 56. The trailer device 50 further includes a image providing structure 60 including a side predefined graphic image 62.

The rear facing camera device 30 captures images within a field of view 32. The image providing structure 60 is attached to the trailer coupler 52 and includes at least one side predefined graphic image 62. The truck 20 further includes a computerized hitching maneuver controller 80 operating programming to analyze images captured by the rear facing camera device 30. The computerized hitching maneuver controller 80 includes a library of stored image data. The library includes data operable to permit the computerized hitching maneuver controller 80 to recognize the side predefined graphic image 62, determine an orientation and size of the side predefined graphic image 62, and interpret a relative position and relative orientation of the side predefined graphic image 62 in relation to the rear facing camera device 30 based upon stored dimensional properties of the side predefined graphic image 62 stored in the library.

The truck 20 may include an internal data communication system such as a bus device operable to permit the computerized hitching maneuver controller 80 to send and receive data from various systems and devices within the truck 20 including the rear facing camera device 30.

Figure 2:
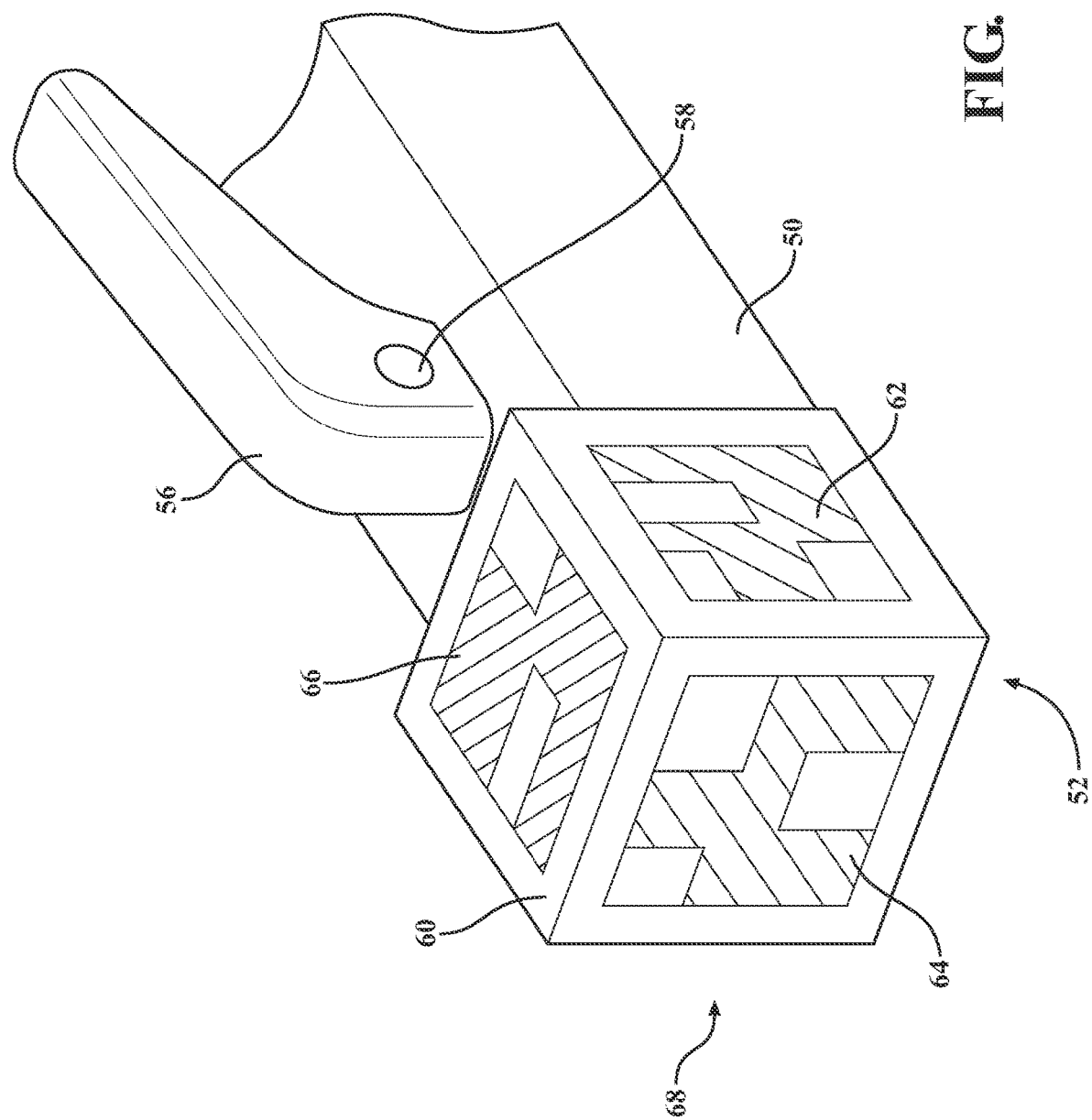
FIG. 2 schematically illustrates in perspective view the trailer device of FIG. 1 including the image providing structure including the side predefined graphic image, in accordance with the present disclosure.

FIG. 2 schematically illustrates in perspective view the trailer device 50 of FIG. 1 including the image providing structure 60 including the side predefined graphic image 62. The image providing structure 60 includes a first predefined image 64 disposed on a front surface of the image providing structure 60, is forward facing, and aligned with a longitudinal axis of the trailer device 50. The image providing structure 60 further includes a second predefined image 66 disposed on a top surface of the image providing structure 60, is upward facing, and in a perpendicular orientation to the first predefined image 64. The side predefined graphic image 62 is illustrated upon a first side surface of the image providing structure 60. The image providing structure 60 may further include an additional side predefined graphic image 68 disposed on an opposite side of the image providing structure 60 from the side predefined graphic image 62. Each of the first predefined graphic image 64, the second predefined graphic image 66, the side predefined graphic image 62, and the additional side predefined graphic image 68 include distinct/unique images such that analysis of captured images taken by rear facing camera device 30 may clearly identify which of the graphic images is in the captured images.

The trailer device is illustrated including a trailer coupler 52 located below the image providing structure 60, the gripper feature lever 56, and a lever lock through feature 58. The lever lock through feature 58 may be utilized to use a padlock to lock the trailer coupler 52 upon a trailer hitch ball. In one embodiment, the image providing structure 60 may be attached to the lever lock through feature 58.

The graphic images imprinted upon the image providing structure 60 may take different forms. As illustrated in FIG. 2, the images may include black and white block images or patterns which are easily recognized by the programming of the computerized hitching maneuver controller 80. The black and white block patterns may include block pattern markers utilized in augmented reality applications. In some embodiments, larger or simpler block patterns may be utilized for increased detection at longer distances. In another embodiment, one or more of the images may include a trademark or decorative pattern. A graphic image with distinctive shapes which may be readable upon images captured by rear facing camera device 30 may be utilized for the graphic images imprinted upon the image providing structure 60.

Figure 3:
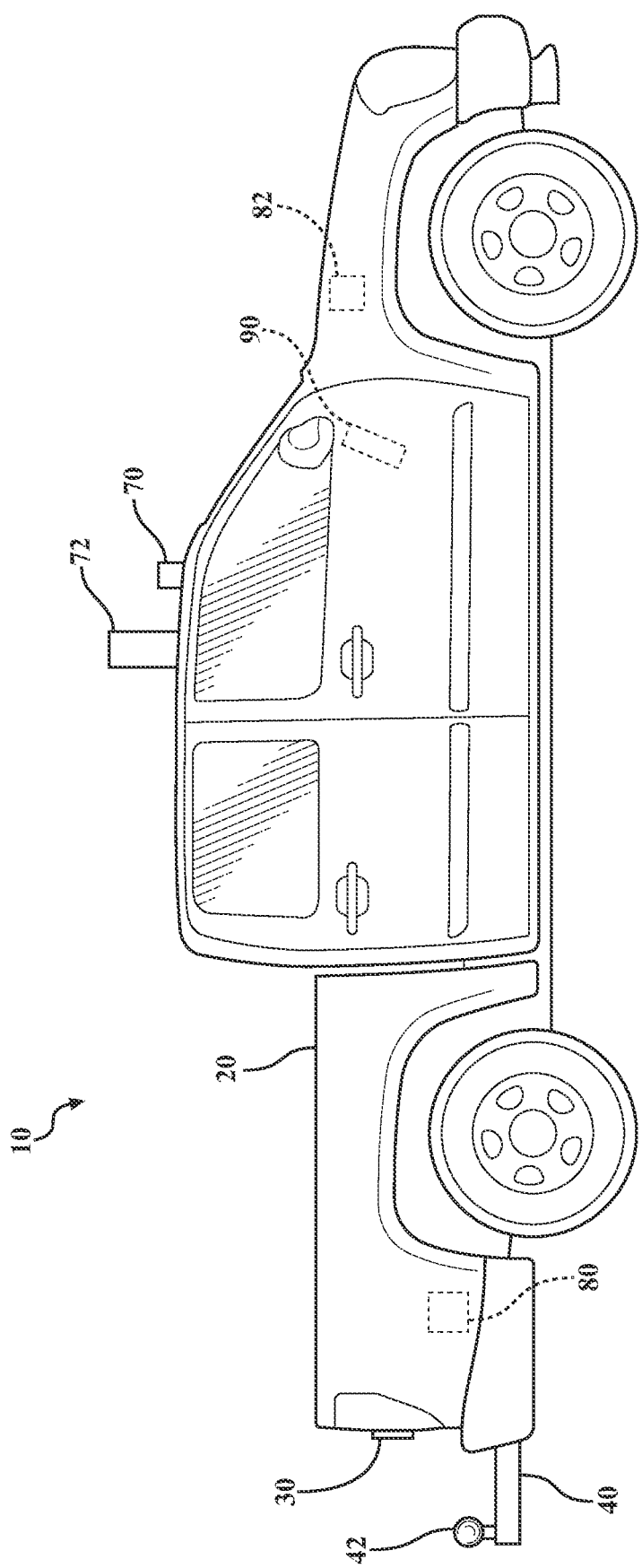
FIG. 3 schematically illustrates in side view the light duty truck of the system, in accordance with the present disclosure.

FIG. 3 schematically illustrates in side view the light duty truck 20 of the system 10. The light duty truck 20 is exemplary, and the disclosed system 10 may be utilized upon a vehicle configured to include a trailer hitch. The light duty truck 20 includes the rear facing camera device 30, the trailer hitch 40, the trailer hitch ball 42, the computerized hitching maneuver controller 80, a forward-facing camera device 70, a LIDAR sensor device 72, a computerized automated navigation controller 82, and a graphic display device 90. The computerized automated navigation controller 82 may be operable to utilize information from the forward-facing camera device 70 and the LIDAR sensor device 72 to navigate the light duty truck 20 upon a roadway. Navigation controlled by the computerized automated navigation controller 82 may include autonomous navigation operating independently of a driver and/or semi-autonomous navigation including active participation by a driver. In one embodiment, the computerized automated navigation controller 82 may receive information from the computerized hitching maneuver controller 80 to execute or aid navigation of the vehicle through the hitching maneuver.

The graphic display device 90 is disposed within the passenger compartment and is oriented to provide information to a driver of the light duty truck 20. Information provided to the driver through the graphic display device 90 may be provided by the computerized hitching maneuver controller 80 and may include a horizontal or straight line distance between the trailer hitch ball 42 and the trailer coupler 52, a vertical distance between a top of the trailer hitch ball 42 and a bottom of the trailer coupler 52, a graphic projected upon the screen configured to aid a driver in maneuvering the vehicle correctly through a hitching maneuver, and other relevant information.

Figure 4:
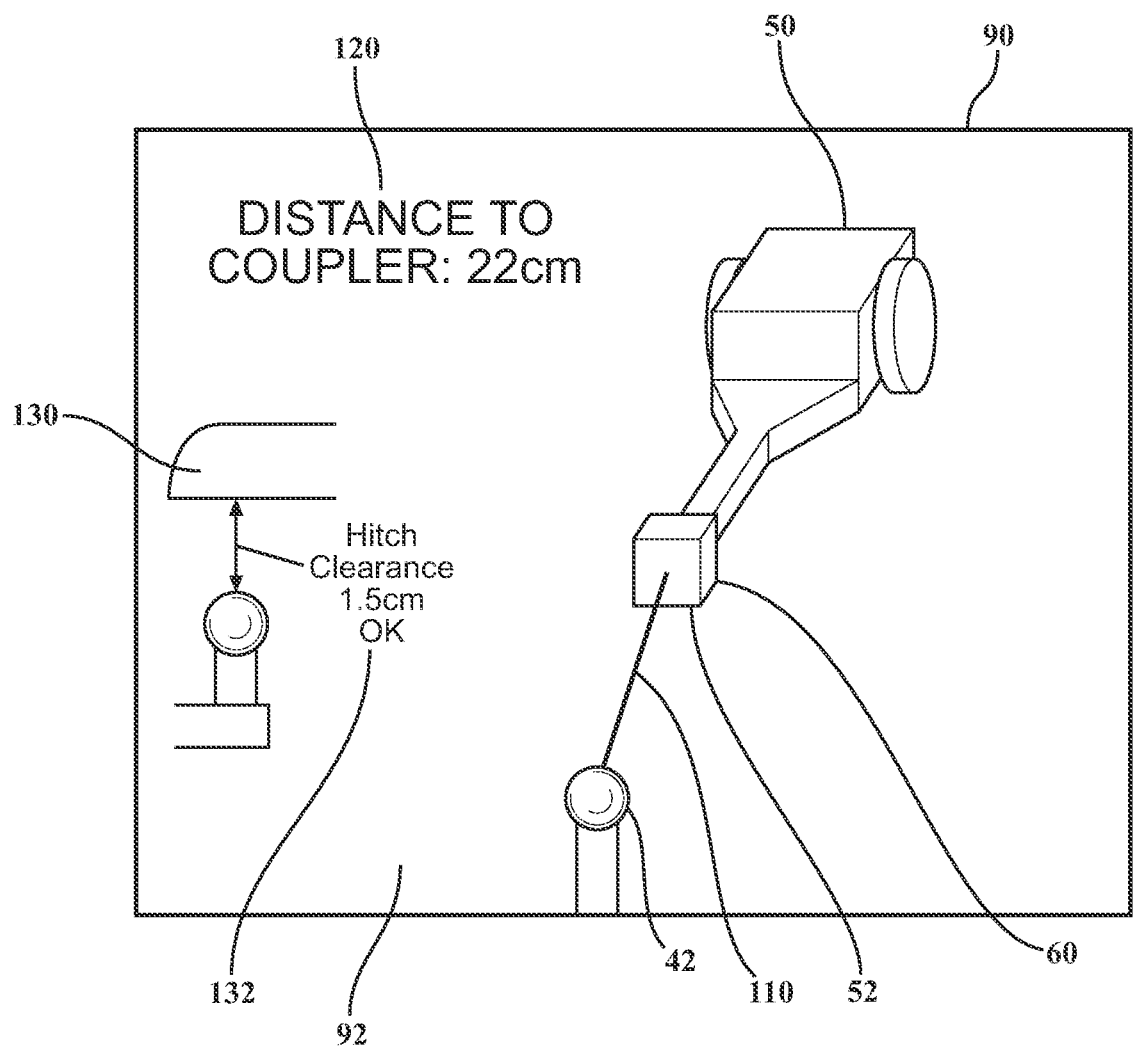
FIG. 4 schematically illustrates the graphic display device of FIG. 3, in accordance with the present disclosure.

FIG. 4 schematically illustrates the graphic display device 90 of FIG. 3. The graphic display device 90 is illustrated including display screen 92. The display screen may include a flat screen display device which may or may not include touch screen input capability. The display screen 92 includes an image captured by the rear facing camera device 30 of FIG. 1, including a view of the trailer hitch ball 42 and the trailer device 50. The image providing structure 60 is visible upon the trailer device 50 including predefined graphic images imprinted upon the structure. The image providing structure 60 is attached to a trailer coupler of the trailer device 50.

Based upon analysis of the image displayed upon the display screen 92, including analysis of at least one graphic image upon the image providing structure 60, a computerized processor may determine the disclosed information relative to a hitching maneuver.

The display screen includes a graphic 110 configured to provide the driver with a direction to move the vehicle to complete a hitching maneuver. In the embodiment of FIG. 4, the graphic 110 including a line is projected on the display screen 92 connecting the trailer hitch ball 42 to a determined or calibrated location of the trailer coupler 52. The line may be used to show a desired trajectory of the trailer hitch ball. In one embodiment, data from the computerized automated navigation controller 82 and/or the computerized hitching maneuver controller 80 may be utilized to judge how accurately the vehicle is being moved to accomplish a hitching maneuver. The graphic 110 may be color coded, for example, with a green color being used when movement of the vehicle is accurately approaching the trailer coupler 52, with a yellow color being used when movement of the vehicle is close to being accurate, and with a red color being used when movement of the vehicle is not close to being accurate. The display screen 92 may further display a determined distance 120 between the trailer hitch ball 42 and the trailer coupler 52. In another embodiment, the graphic 110 may alternatively include a color-coded arrow graphic describing a direction the vehicle should move to accomplish the hitching maneuver. In another embodiment, the graphic 110 may alternatively include a recommended steering wheel angle to accomplish the hitching maneuver.

In one embodiment, data from the computerized automated navigation controller 82 and/or the computerized hitching maneuver controller 80 may be utilized to estimate a vertical distance or vertical clearance between a top of the trailer hitch ball 42 and a bottom of the trailer coupler 52. The display screen 92 may display a graphic 130 illustrating the estimated clearance between the top of the trailer hitch ball 42 and the bottom of the trailer coupler 52. The display screen 92 may further include textual graphic 132 describing the estimated clearance.

Figure 5:
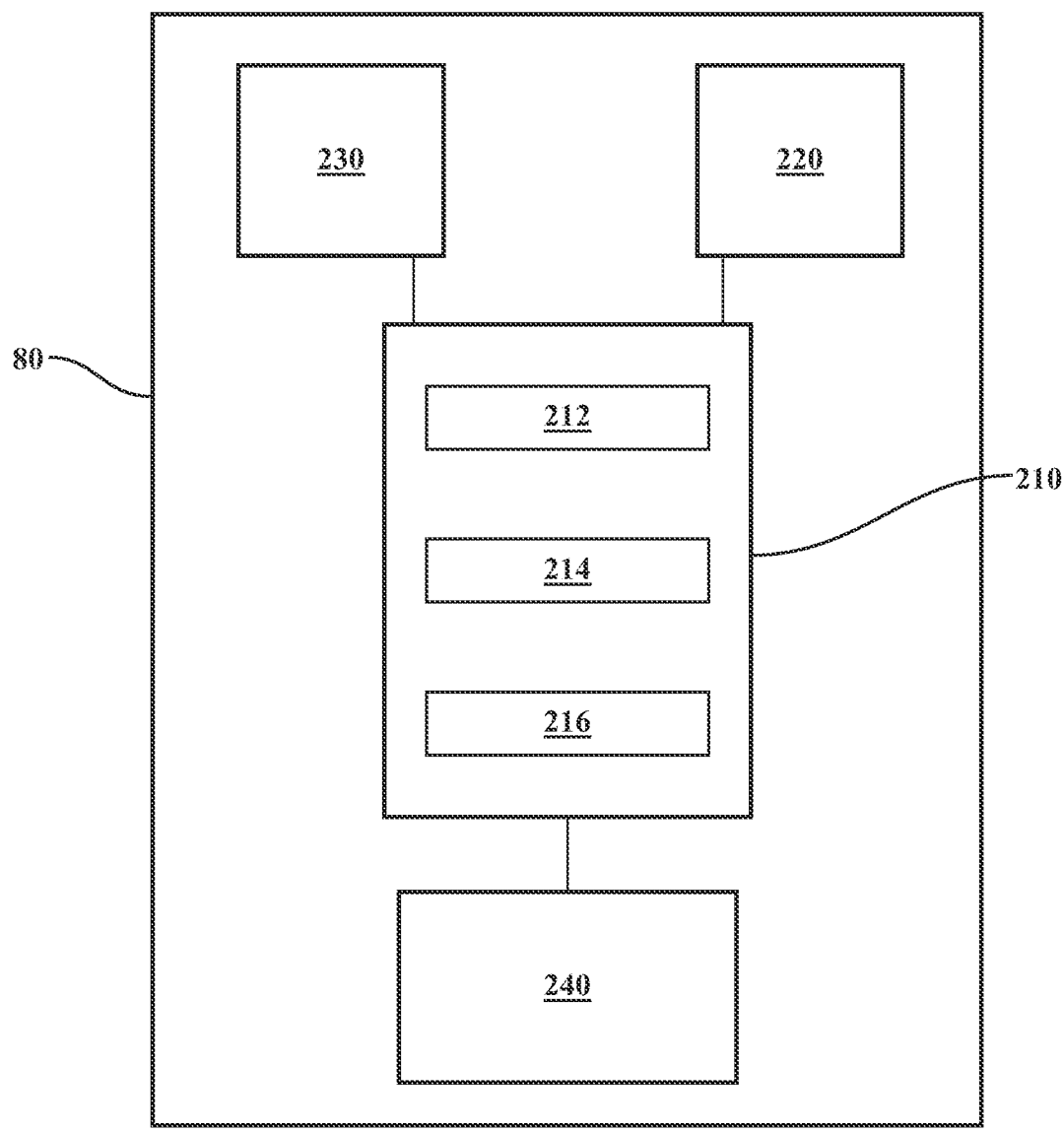
FIG. 5 schematically illustrates the computerized hitching maneuver controller, in accordance with the present disclosure.

FIG. 5 schematically illustrates the computerized hitching maneuver controller 80. The computerized hitching maneuver controller 80 includes a processing device 210, a communications device 220, a data input output device 230, and a memory storage device 240. The controller 80 may include other components and some of the components are not present in some embodiments.

The processing device 210 may include memory, e.g., read only memory (ROM) and random-access memory (RAM), storing processor-executable instructions and one or more processors that execute the processor-executable instructions. In embodiments where the processing device 210 includes two or more processors, the processors may operate in a parallel or distributed manner. Processing device 210 may execute the operating system of the computerized hitching maneuver controller 80. Processing device 210 may include one or more modules executing programmed code or computerized processes or methods including executable steps. Illustrated modules may include a single physical device or functionality spanning multiple physical devices. In the illustrative embodiment, the processing device 210 includes an initial hitch maneuver calibration module 212, an image analysis module 214, and a hitching maneuver execution module 216, which are described in greater detail below.

The data input output device 230 is a device that is operable to take data gathered from sensors and devices throughout the vehicle and process the data into formats readily usable by processing device 210. Data input output device 230 is further operable to process output from processing device 210 and enable use of that output by other devices or computerized controllers throughout the vehicle.

The communications device 220 may include a communications/data connection with a bus device configured to transfer data to different components of the system and may include one or more wireless transceivers for performing wireless communication.

The memory storage device 240 is a device that stores data generated or received by the controller 80. The memory storage device 240 may include, but is not limited to, a hard disc drive, an optical disc drive, and/or a flash memory drive.

The initial hitch maneuver calibration module 212 includes programmed code operable to execute and analyze data related to an initial hitching maneuver. In one embodiment, module 212 may provide instructions to the driver to manually hitch a trailer coupler equipped with an image providing structure 60 from FIG. 1 to a trailer hitch ball 42 for the vehicle. Once the manual hitching of the trailer coupler 52 is complete, the module 212 may analyze images visible upon the image providing structure 60 corresponding to the trailer hitch ball 42 and the trailer coupler 52 being fully engaged to determine an estimated relative position of the trailer hitch ball 42 in relation to the rear facing camera device 30 capturing the image used in the analysis of module 212. This relative position of the trailer hitch ball 42 may be used in subsequent trailer hitching maneuvers as a calibrated offset between the rear facing camera device 30 and the trailer hitch ball 42.

The image analysis module 214 includes programmed code operable to receive and process images captured by a rear facing camera device 30. The module 214 includes programming to identify predefined graphic images upon the image providing structure 60 in the captured images and to compare portions of the predefined images including the predefined graphic images to data stored in the memory storage device 240. The module 214 includes programming to estimate a relative position and/or a relative orientation of the image providing structure 60 in relation to the rear facing camera device 30. The module 214 may further include programming to incorporate a calibrated offset between the rear facing camera device 30 and the trailer hitch ball 42 provided by module 212 and information related to an offset between the structure 60 and associated trailer coupler to determine a relative position and a relative orientation of the trailer coupler 52 to the trailer hitch ball 42. The module 214 may further include programming to determine a vertical distance between a top of the trailer hitch ball 42 and a bottom of the trailer coupler 52.

The hitching maneuver execution module 216 includes programmed code operable to provide data and instructions relevant to executing a hitching maneuver. Module 216 may receive data from module 214 and may provide graphical instructions to the graphical display device 90 of FIG. 4. Module 216 may additionally or alternatively provide data and/or instructions to the computerized automated navigation controller 82 of FIG. 3 for use in providing automated or semi-automated navigation of the vehicle.

The computerized automated navigation controller 82 includes hardware and programming similar to the computerized hitching maneuver controller 80, with programming of the controller 82 including analysis of information regarding an operating environment of the vehicle, analysis of a planned navigational maneuver or travel route, and control over longitudinal motion and steering angle of the vehicle.

The computerized hitching maneuver controller 80 is provided as an exemplary computerized device capable of executing programmed code to execute control schemes related to execution of a hitching maneuver in accordance with the present disclosure. A number of different embodiments of the controller 80, devices attached thereto, and modules operable therein are envisioned, and the disclosure is not intended to be limited to examples provided herein.

Figure 6:
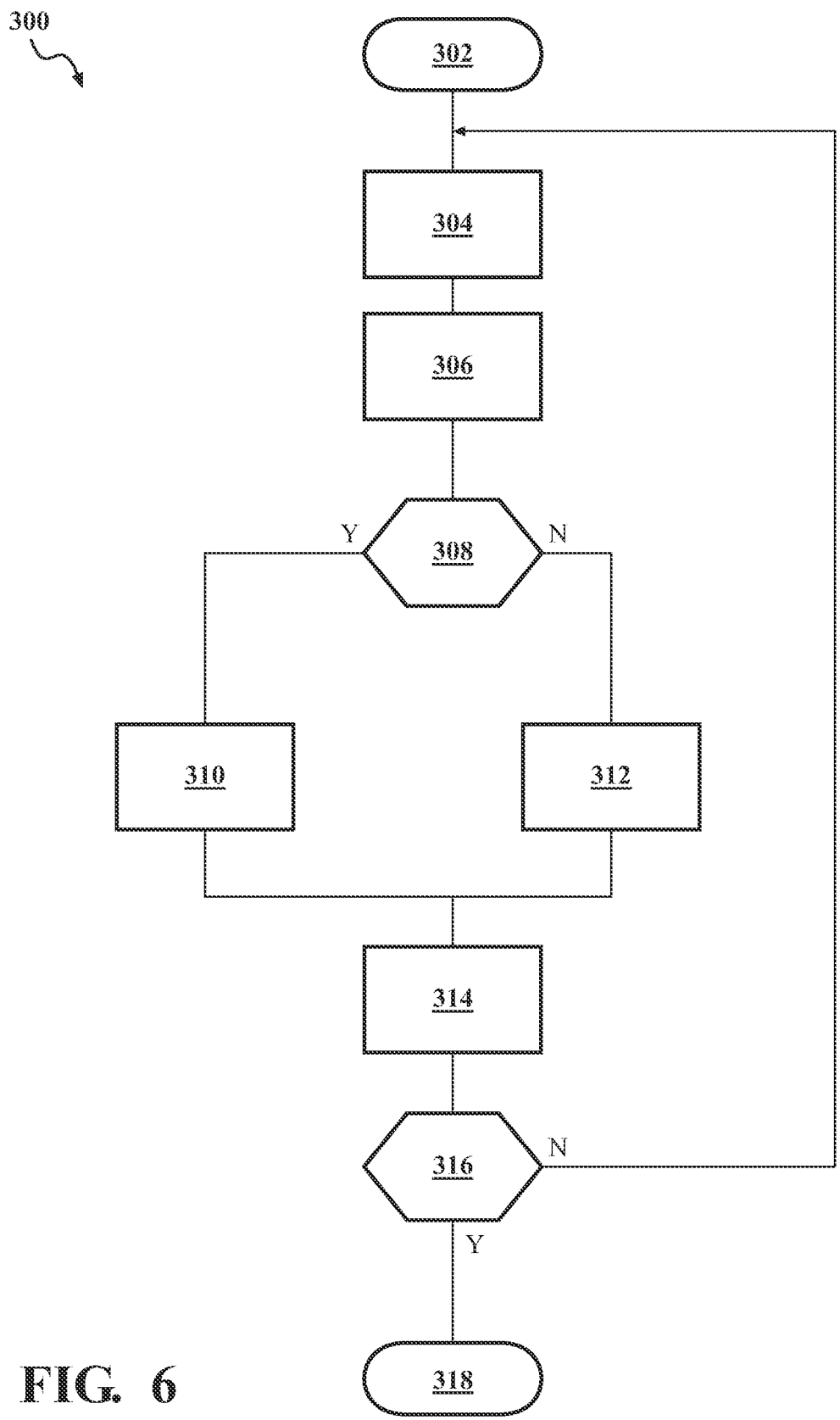
FIG. 6 is a flowchart illustrating an exemplary method to execute a hitching maneuver for a vehicle, in accordance with the present disclosure.

FIG. 6 is a flowchart illustrating an exemplary method 300 to execute a hitching maneuver for a vehicle. The method 300 starts at step 302. At step 304, one or more images captured by a rear facing camera device are analyzed, and predefined graphic images located upon a graphic providing structure attached to a trailer coupler are identified. At step 306, a relative position and a relative orientation of the trailer coupler to a trailer hitch ball of the vehicle are determined. In one embodiment, step 306 includes determining a relative position and a relative orientation of the graphic providing structure to the rear facing camera device and then utilizing offset values to determine the relative position and the relative orientation of the trailer coupler to the trailer hitch ball. At step 308, a determination is made whether the relative position, the relative orientation, and motion of the vehicle are consistent with accurate execution of the hitching maneuver. If accurate execution of the hitching maneuver is confirmed, the method advances to step 310 where affirming actions are identified for execution. If accurate execution of the hitching maneuver is not confirmed, the method advances to step 312 where corrective actions are identified for execution. At step 314, at least one output is generated based upon the actions determined in one of step 310 or step 312. If the vehicle is being operated manually, the actions may include graphic output to a graphic display device visible to a driver of the vehicle. The output may additionally or alternatively include an audible output. If the vehicle is being operated autonomously or semi-autonomously, the actions may include navigational instructions to a computerized autonomous navigation controller. At step 316, a determination is made whether the hitching maneuver is complete. If the hitching maneuver is determined to be complete, the method advances to step 318 where the method ends. If the hitching maneuver is determined to not be complete, the method returns to step 304 where an additional or subsequent captured image is analyzed. The method 300 is provided as an exemplary method to utilize the disclosed system to execute a hitching maneuver. A number of alternative and/or additional method steps are envisioned, and the disclosure is not intended to be limited to the examples provided herein.

Figure 7:
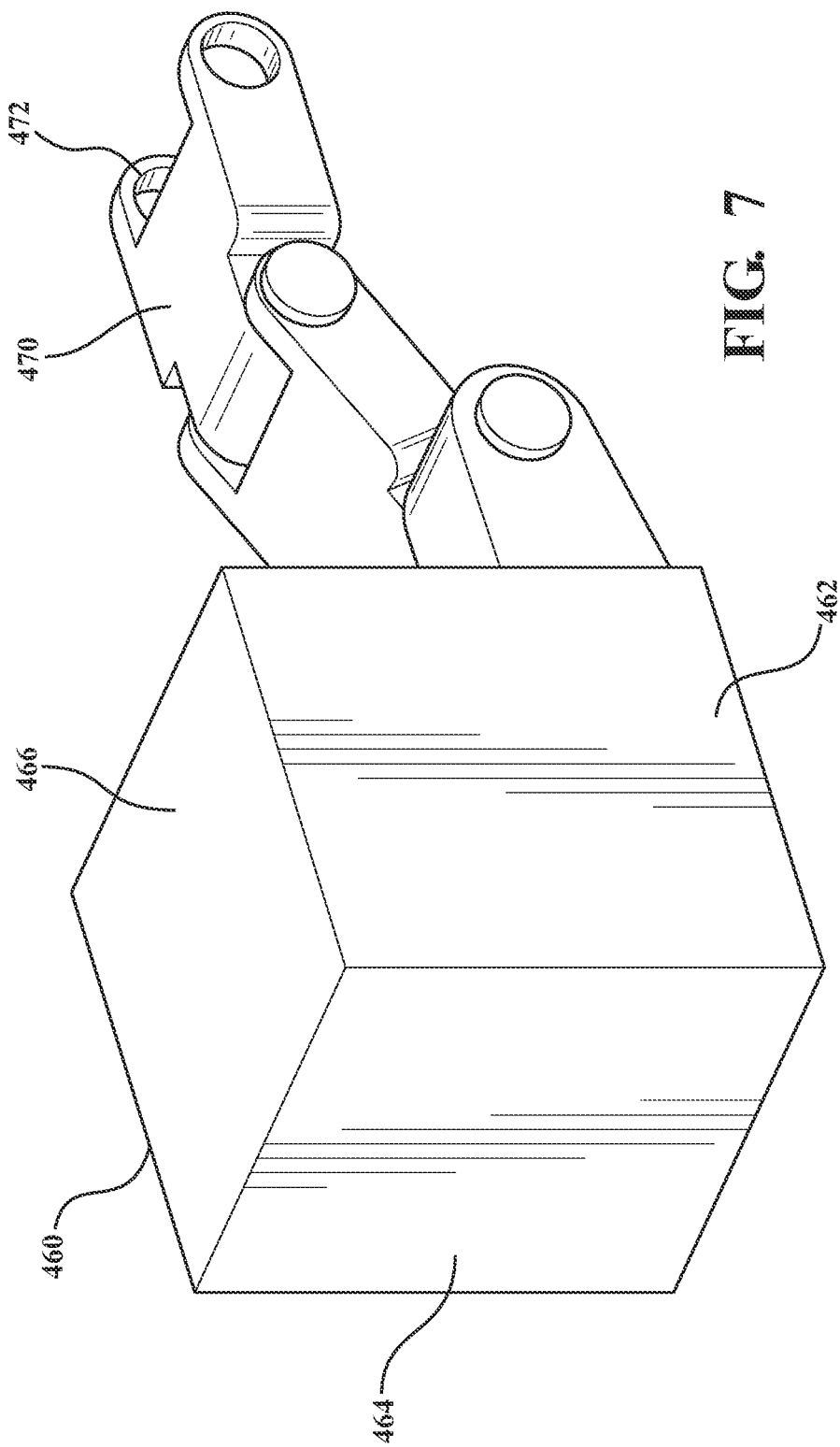
FIG. 7 schematically illustrates in perspective view an exemplary alternative graphic providing structure configured to be attached to a lever lock through feature of a trailer coupler, in accordance with the present disclosure.

FIG. 7 schematically illustrates in perspective view an exemplary alternative graphic providing structure 460 configured to be attached to a lever lock through feature of a trailer coupler. The graphic providing structure 460 includes faces 462, 464, and 466 configured to receive predefined graphic images in accordance with the disclosure. The graphic providing structure 460 further includes an attachment arm 470 including attachment holes 472 configured to be attached to the lever lock through feature 58 of FIG. 2 in order to affix the graphic providing structure 460 upon a trailer coupler.

Figure 8:
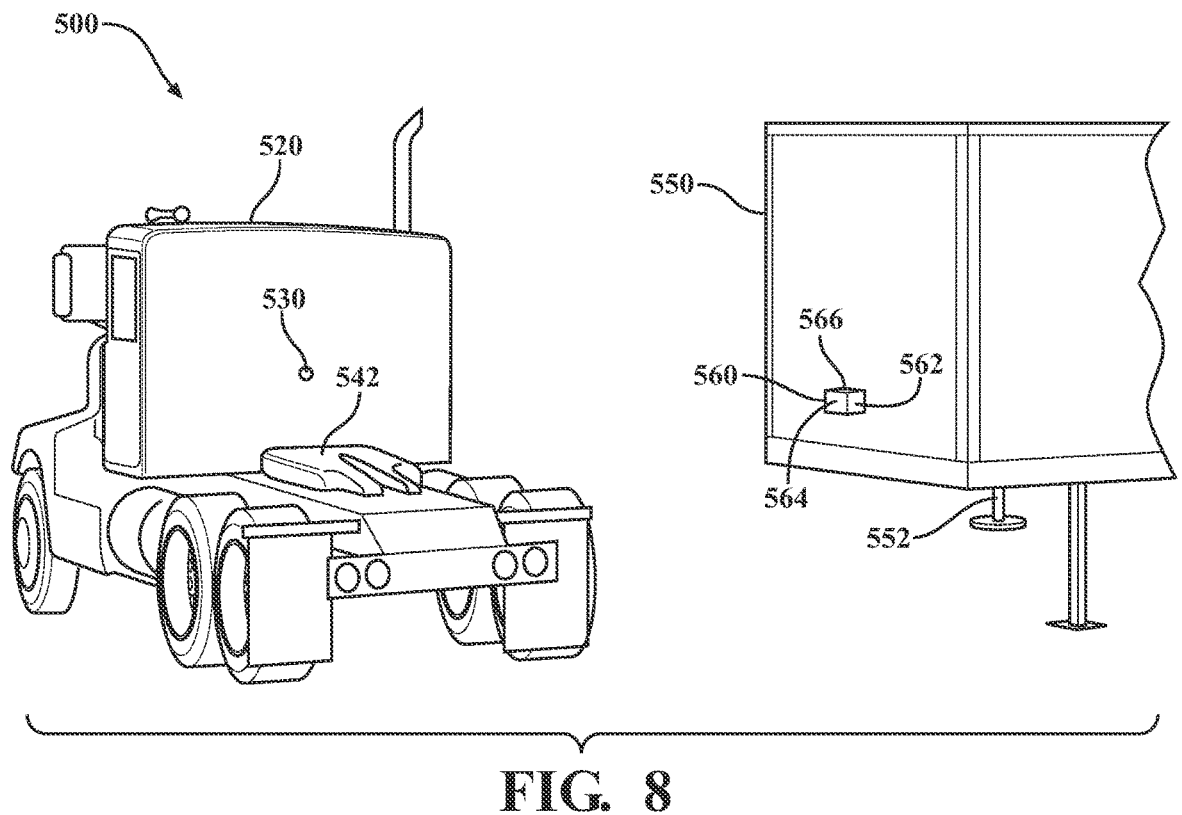
FIG. 8 schematically illustrates in perspective view an alternative system for trailer coupler localization for guidance during a hitching maneuver, in accordance with the present disclosure.

The disclosed system and method are useful to connect a vehicle trailer hitch feature with a mating trailer-mounted hitch feature. In some embodiments, such as the embodiment of FIG. 1, these features include a trailer hitch ball and a trailer coupler. In other types of hitch configurations, a hitch head upon a vehicle may connect with a kingpin located upon a trailer. FIG. 8 schematically illustrates in perspective view an alternative system 500 for trailer coupler localization for guidance during a hitching maneuver. The system 500 is illustrated including exemplary commercial truck 520 and commercial trailer device 550. The commercial truck 520 includes a rear facing camera device 530, and a trailer hitch head 542. The commercial trailer device 550 includes a trailer kingpin device 552. The commercial trailer device 550 further includes an image providing structure 560 including a side predefined graphic image 562, a front predefined graphic image 564, and a top predefined graphic image 566. The commercial truck 520 includes functionality similar to the light duty truck 20 of FIG. 1, including a computerized processor and a graphical display device useful to provide disclosed images and related information to a driver of the commercial truck 520 during a hitching maneuver and accomplish calibration operations during an initial hitching maneuver.

Figure 9:
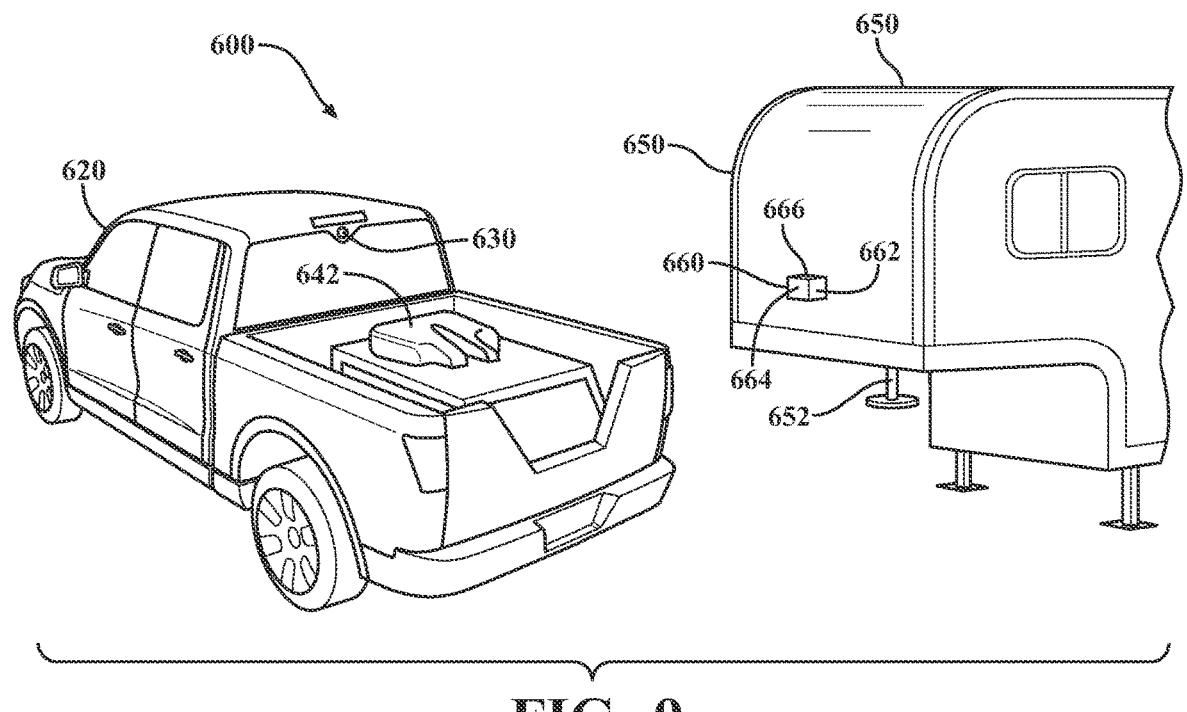
FIG. 9 schematically illustrates in perspective view an additional alternative system for trailer coupler localization for guidance during a hitching maneuver, in accordance with the present disclosure.

FIG. 9 schematically illustrates in perspective view an alternative system 600 for trailer coupler localization for guidance during a hitching maneuver. The system 600 is illustrated including exemplary medium duty truck 620 and fifth wheel trailer device 650. The medium duty truck 620 includes a rear facing camera device 630, and a trailer hitch head 642. The fifth wheel trailer device 650 includes a trailer kingpin device 652. The fifth wheel trailer device 650 further includes an image providing structure 660 including a side predefined graphic image 662, a front predefined graphic image 664, and a top predefined graphic image 666. The medium duty truck 620 includes functionality similar to the light duty truck 20 of FIG. 1, including a computerized processor and a graphical display device useful to provide disclosed images and related information to a driver of the medium duty truck 620 during a hitching maneuver and accomplish calibration operations during an initial hitching maneuver. In one embodiment, a gooseneck trailer, which may include a hybrid of properties of a fifth wheel trailer device and a trailer device utilizing a trailer coupler, may be utilized with the disclosed system.

While the best modes for carrying out the disclosure have been described in detail, those familiar with the art to which this disclosure relates will recognize various alternative designs and embodiments for practicing the disclosure within the scope of the appended claims.

What is claimed is:

1. A system for trailer coupler localization for guidance during a hitching maneuver for
a vehicle, the system comprising:
a trailer hitch ball;
a trailer device including:
  a trailer coupler; and
  a graphic providing structure affixed to the trailer coupler, the graphic providing structure including at least one predefined graphic image;
a rear facing camera device attached to the vehicle and operable to provide a captured image of the predefined graphic image; and
a computerized hitching maneuver controller, including programming to:
  receive the captured image of the predefined graphic image;
  analyze the captured image of the predefined graphic image to determine a position of the graphic providing structure relative to the rear facing camera device;
  determine a position of the trailer coupler relative to the trailer hitch ball of the vehicle by utilizing an offset value between the trailer hitch ball and a position of the rear facing camera device, an offset value between the trailer coupler and a position of the graphic providing structure, and the position of the graphic providing structure relative to the rear facing camera device; and
  provide an output to control the hitching maneuver based upon the position of the trailer coupler relative to the trailer hitch ball of the vehicle.

2. The system of claim 1, wherein providing the output to control the hitching maneuver includes providing a graphical display to a driver of the vehicle describing the position of the trailer coupler relative to the trailer hitch ball of the vehicle.

3. The system of claim 2, wherein providing the graphical display includes providing a graphical image including a line superimposed upon an image including the trailer hitch ball and the trailer coupler, wherein the line connects the trailer hitch ball to the trailer coupler.

4. The system of claim 3, wherein the line is color-coded to indicate an accuracy of execution of the hitching maneuver.

5. The system of claim 2, wherein providing the graphical display includes providing a distance between the trailer hitch ball and the trailer coupler.

6. The system of claim 2, wherein providing the graphical display includes providing a vertical clearance between a top of the trailer hitch ball and a bottom of the trailer coupler.

7. The system of claim 1, wherein the computerized hitching maneuver controller further includes programming to determine orientation of the trailer coupler relative to the trailer hitch ball.

8. The system of claim 1, wherein the graphic providing structure further includes a plurality of predefined graphic images.

9. The system of claim 8, wherein a first predefined graphic image is forward facing and disposed upon a front of the trailer coupler; and wherein a second predefined graphic image is upward facing and disposed upon a top of the trailer coupler.

10. The system of claim 9, wherein a third predefined graphic image is disposed upon a first side of the trailer coupler; and wherein a fourth predefined graphic image is disposed upon a second side of the trailer coupler.

11. The system of claim 1, wherein the predefined graphic image includes a black and white block image.

12. The system of claim 1, wherein the predefined graphic image includes a block pattern marker image.

13. The system of claim 1, wherein providing the output to control the hitching maneuver includes providing data to a computerized autonomous navigation controller of the vehicle.

14. The system of claim 1, wherein the graphic providing structure includes an attachment arm operable to be attached to a lever lock through feature of the trailer coupler.

15. A system for trailer coupler localization for guidance during a hitching maneuver for a vehicle, the system comprising:
a vehicle trailer hitch feature;
a trailer device including:
  a mating trailer-mounted hitch feature; and
  a graphic providing structure affixed to the trailer device, the graphic providing structure including at least one predefined graphic image;
a rear facing camera device attached to the vehicle and operable to provide a captured image of the predefined graphic image; and
a computerized hitching maneuver controller, including programming to:
  receive the captured image of the predefined graphic image;
  analyze the captured image of the predefined graphic image to determine a position of the graphic providing structure relative to the rear facing camera device;
  determine a position of the mating trailer-mounted hitch feature relative to the vehicle trailer hitch feature by utilizing an offset value between the vehicle trailer hitch feature and a position of the rear facing camera device, an offset value between the mating trailer-mounted hitch feature and a position of the graphic providing structure, and the position of the graphic providing structure relative to the rear facing camera device; and
  provide an output to control the hitching maneuver based upon the position of the mating trailer-mounted hitch feature relative to the vehicle trailer hitch feature.

16. The system of claim 15, wherein the vehicle trailer hitch feature includes a hitch head disposed upon the vehicle; and wherein the mating trailer-mounted hitch feature includes a kingpin disposed upon the trailer device.

17. A method for trailer coupler localization for guidance during a hitching maneuver for
a vehicle, the method comprising:
utilizing a rear facing camera device upon the vehicle to provide a captured image of a graphic providing structure attached to a trailer coupler, wherein the captured image includes at least one predefined graphic image imprinted upon the graphic providing structure; and
within a computerized processor, operating programming to:
  receive the captured image including the predefined graphic image;
  analyze the captured image including the predefined graphic image to determine a position of the graphic providing structure relative to the rear facing camera device;
  determine a position of the trailer coupler relative to a trailer hitch ball of the vehicle by utilizing an offset value between the trailer hitch ball and a position of the rear facing camera device, an offset value between the trailer coupler and a position of the graphic providing structure, and the position of the graphic providing structure relative to the rear facing camera device; and provide an output to control the hitching maneuver based upon the position of the trailer coupler relative to the trailer hitch ball of the vehicle.

18. The method of claim 17, wherein providing the output to control the hitching maneuver includes providing a graphical display to a driver of the vehicle describing the position of the trailer coupler relative to the trailer hitch ball of the vehicle.

19. The method of claim 17, further comprising determining orientation of the trailer coupler relative to the trailer hitch ball.

20. The method of claim 17, wherein providing the output to control the hitching maneuver includes providing data to a computerized autonomous navigation controller of the vehicle.

\* \* \* \* \*